United States Patent
Namer et al.

(10) Patent No.: US 9,988,801 B2
(45) Date of Patent: *Jun. 5, 2018

(54) VACUUM TOILET ASSEMBLY

(71) Applicant: MAG Aerospace Industries, LLC, Carson, CA (US)

(72) Inventors: Arnaud Namer, Torrance, CA (US); David A. Beach, Seal Beach, CA (US); Joerg Stachowski, San Pedro, CA (US); Howard C. B. Kuhns, Long Beach, CA (US); Jorge Alfonso Bautista Hernandez, Cerritos, CA (US); Oscar Mathews, Mission Viejo, CA (US); Razmik B. Boodaghians, Glendale, CA (US)

(73) Assignee: MAG Aerospace Industries, LLC, Carson, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/381,486

(22) Filed: Dec. 16, 2016

(65) Prior Publication Data

US 2017/0145675 A1 May 25, 2017

Related U.S. Application Data

(63) Continuation of application No. 15/088,951, filed on Apr. 1, 2016, now Pat. No. 9,657,473.

(Continued)

(51) Int. Cl.
*E03D 11/14* (2006.01)
*B64D 11/02* (2006.01)

(Continued)

(52) U.S. Cl.
CPC .............. *E03D 11/02* (2013.01); *B64D 11/02* (2013.01); *E03F 1/006* (2013.01)

(58) Field of Classification Search
CPC .......... E03D 11/14; B64D 11/02; E03F 1/006; F16B 21/02

(Continued)

(56) References Cited

U.S. PATENT DOCUMENTS

| 3,939,500 A | 2/1976 | Miller et al. |
| 5,604,938 A | 2/1997 | Tyler |

(Continued)

FOREIGN PATENT DOCUMENTS

| JP | 2013127153 | 6/2013 |
| WO | 2010039567 | 4/2010 |
| WO | 2016161334 | 10/2016 |

OTHER PUBLICATIONS

International Patent Application No. PCT/US2016/025646, Invitation to Pay Additional Search Fees and Partial Search Report dated Jul. 8, 2016.

(Continued)

*Primary Examiner* — Tuan N Nguyen
(74) *Attorney, Agent, or Firm* — Kilpatrick Townsend & Stockton LLP; Dean W. Russell; Kristin M. Crall

(57) ABSTRACT

Embodiments of the disclosure provide systems and methods for improved removability and ease of maintenance for one or more components of the vacuum toilet system. They can be particularly useful on-board aircraft and other passenger transport vehicles. Specific embodiments relate to a rinse valve bracket and connection system, a rinse ring tie down, and various improved connection systems.

14 Claims, 17 Drawing Sheets

Related U.S. Application Data

(60) Provisional application No. 62/142,744, filed on Apr. 3, 2015.

(51) Int. Cl.
    *E03F 1/00*         (2006.01)
    *F16B 21/02*      (2006.01)
    *E03D 11/02*      (2006.01)

(58) Field of Classification Search
    USPC .......................................................... 4/252.1
    See application file for complete search history.

(56) References Cited

U.S. PATENT DOCUMENTS

| | | |
|---|---|---|
| 6,349,425 B1 | 2/2002 | Straydinger et al. |
| 9,182,042 B2 | 11/2015 | Weber et al. |
| 9,657,473 B2 * | 5/2017 | Namer ................... B64D 11/02 |
| 2009/0260141 A1 | 10/2009 | McDaniel |
| 2014/0137319 A1 | 5/2014 | Beach et al. |
| 2014/0208498 A1 | 7/2014 | Beach et al. |
| 2016/0289944 A1 | 10/2016 | Namer et al. |

OTHER PUBLICATIONS

International Patent Application No. PCT/US2016/025646, Search Report and Written Opinion dated Sep. 2, 2016.

\* cited by examiner

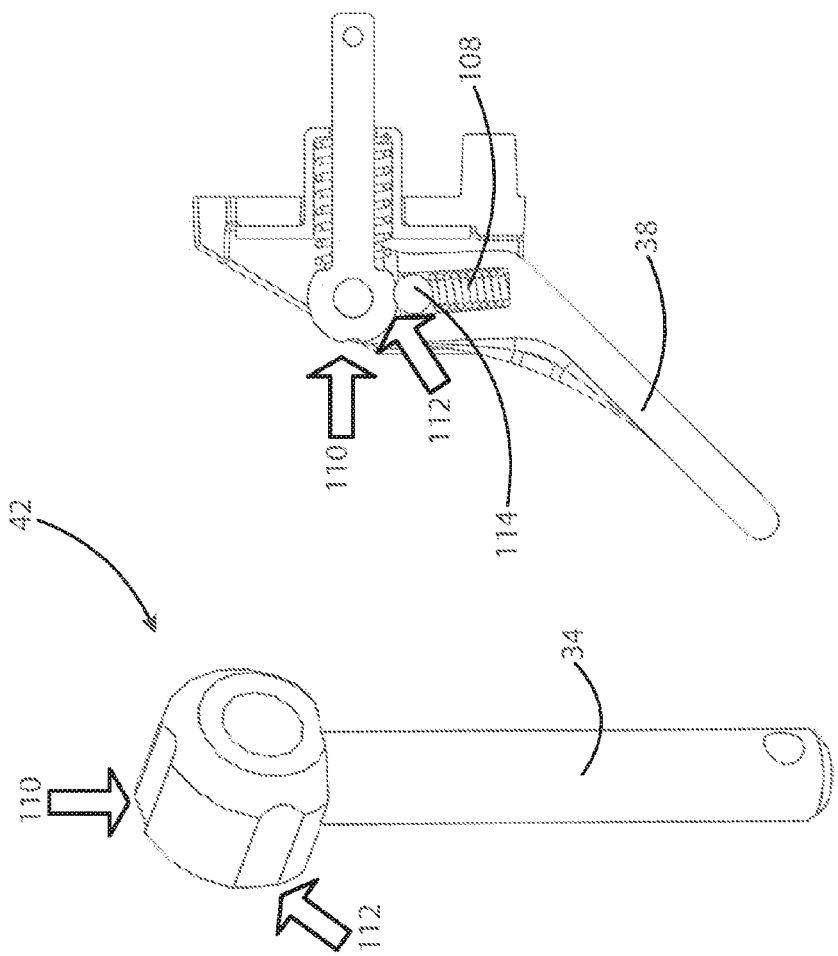
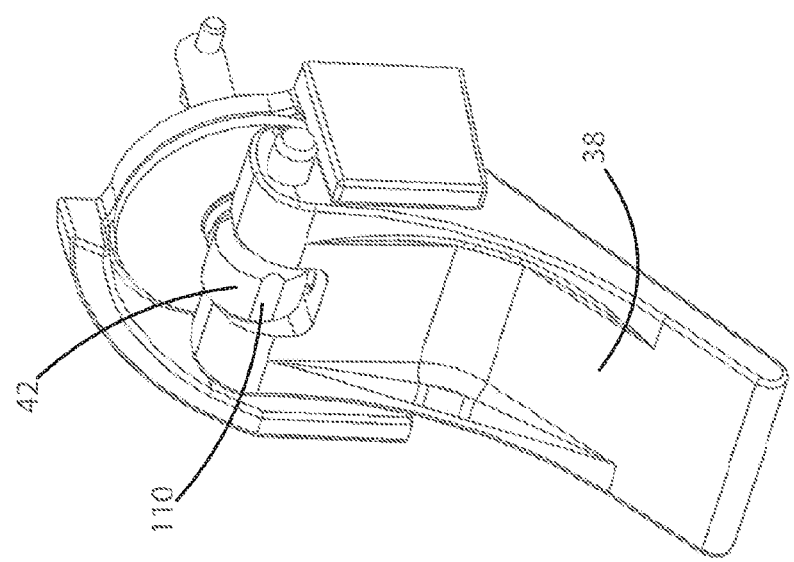
FIG. 16A   FIG. 16B   FIG. 16C

VACUUM TOILET ASSEMBLY

CROSS REFERENCE TO RELATED APPLICATIONS

This application is a continuation U.S. patent application Ser. No. 15/088,951, filed on Apr. 1, 2016, which application claims the benefit of U.S. Provisional Application No. 62/142,744, filed on Apr. 3, 2015, titled "Vacuum Toilet Improved Assembly," the entire contents the each of which are hereby incorporated by reference.

FIELD OF THE DISCLOSURE

Embodiments of the present disclosure relate generally to vacuum toilet assemblies and various improvements thereto.

BACKGROUND

Many types of passenger transport vehicles (such as aircraft, ships, buses, trains, and any other passenger transport vehicles) use vacuum toilets. A vacuum toilet system typically has a bowl for receiving waste with an outlet that is connected to a vacuum sewer line, which leads to a collection tank placed under at least partial vacuum by a vacuum source. A discharge valve between the bowl outlet and the vacuum sewer line controls and allows fluid communication therebetween. When the discharge valve is opened, waste in the bowl is transported through the sewer line to the collection tank via a pressure differential. Vacuum toilets also use a source of rinse fluid delivered by a rinse fluid ring or dispenser and rinse valve for introducing rinse fluid into the bowl. The discharge flush valve, rinse valve, toilet frame, and toilet bowl are typically provided together as an integral designed unit.

However, toilets for use on-board passenger transport vehicles generally experience a very high service frequency, as there are typically only a few toilets provided that are intended to service hundreds of passengers. Existing toilets in the field are subject to scratches from routine cleaning, which damages and wears the non-stick coating on the toilet bowl. Other components of the toilets also experience wear and need to be periodically replaced. For example, the rinse ring, the toilet bowl, the flush valve, and other components may need replacement. However, because passenger vehicle toilets are also used in a small enclosed space, such as an aircraft lavatory, their removal and replacement is difficult for maintenance personnel. Additionally, in order to replace one or more toilet components, maintenance personnel typically have to remove the entire toilet system (including the rinse ring, rinse valve, flush valve, valve sealing point, anti-siphon valve/vacuum breaker, and other components) from the vehicle or aircraft in order to remove and replace just the portion of the system that needed replacement. Thus, improvements for removing and replacing vacuum toilets are provided herein.

BRIEF SUMMARY

Embodiments of the disclosure provide systems and methods for improved removability and ease of maintenance for one or more components of the vacuum toilet system. They can be particularly useful on-board aircraft and other passenger transport vehicles. Specific embodiments relate to a rinse valve bracket and connection system, a rinse ring tie down, and various improved connection systems.

In one example, there is provided a rinse valve bracket and restraint system for a toilet pedestal frame having an outer surface and a bowl-facing surface, the system comprising: a bracket comprising a retainer connection feature; the toilet pedestal frame comprising a quarter turn securing location supporting a quarter turn retainer extending through the frame and comprising a cam handle, a cam face, and an extending male portion, wherein in use, the bracket is positioned along the outer surface of the toilet frame with the retainer connection feature aligned with the quarter turn securing location, wherein the quarter turn retainer is inserted into the retainer connection feature of the bracket, turned, and clamped, securing the bracket to the toilet pedestal frame.

The bracket may have three connection points. The quarter turn retainer may be rotatably and slidably connected with respect to the toilet pedestal frame but not removable therefrom. The quarter turn retainer may have a spring. The cam face of the quarter turn retainer may have first and second detents, wherein a ball of the handle is urged into the first detent when the handle is in an unlocked position, and wherein the ball of the handle is urged into the second detent when the handle is in a locked position.

The quarter turn securing location can provide a keyhole feature. The male portion of the quarter turn retainer functions like a key. The quarter turn securing location can further comprise a rubber washer.

The rinse valve bracket generally secures a rinse valve with respect to the toilet frame. The rinse valve can comprise a hydraflow clamp. In use, the quarter turn retainer is accessible from the bowl-facing surface of the toilet pedestal frame. The cam handle may be provided with a curved elbow such that is follows a toilet bowl contour when in a locked position.

In a further example, there may be provided a rinse ring securement system for a toilet pedestal frame, the system comprising: a rinse ring comprising at least one quarter turn feature; the toilet pedestal frame comprising at least one corresponding quarter turn connection/receiving feature. The toilet pedestal frame may comprise an extending platform to support the corresponding quarter turn connection/receiving feature. The system may also include first and second quarter turn features on the rinse ring and first and second corresponding quarter turn connection/receiving features on the toilet pedestal frame. The quarter turn feature is generally accessible from the top of the toilet pedestal frame when the rinse ring is secured thereto. The quarter turn feature may be rotatably and slidably connected with respect to the rinse ring but is not removable therefrom.

BRIEF DESCRIPTION OF THE DRAWINGS

FIG. 7A shows the quarter turn retainer prior to being engaged with the bracket. FIG. 7B shows the quarter turn retainer engaged in a retainer connection feature of the bracket. FIG. 7C shows the quarter turn retainer once turned/rotated a quarter turn.

FIG. 7D shows the quarter turn retainer with the cam handle clamped down.

FIGS. 16A-C show various views of a quarter turn retainer. FIG. 16A shows a rear view of the retainer. FIG. 16B shows a close up view of the cam face and the male portion of the retainer. FIG. 16C shows a side cross-sectional view of the retainer in a closed, clamped position.

DETAILED DESCRIPTION

Embodiments of the present invention provide systems and devices for quickly disconnecting and replacing toilet components. For example, aircraft toilets and their various components may need to be easily disconnected from the lavatory space for maintenance or replacement. Rather than requiring multiple bolts or screws that must be individually removed and rather than requiring removal of the entire toilet bowl system and frame, the present disclosure seeks to provide improved ways for installing various toilet components with quick release functionality.

There are applications of the present assignee that are pending and that relate to toilet concepts and improvements. Those applications include U.S. Publication No. 2014/0137319 titled "Toilet Concepts," U.S. Publication No. 2014/0208498 titled "Toilets with Improved Removability for Passenger Transport Vehicles," and U.S. Pat. No. 9,182,042 titled "Mixed Media Orbital Valve." The features described may enhance the various concepts shown and described in those documents.

In one aspect, the toilets are provided with components that are easily removable and replaceable. The examples provided herein can reduce replacement time and eliminate the need for loose hardware that may be lost during line replacement. Quick release of the toilets and/or the related component equipment may be achieved in a reliable and robust manner.

Figure 1:
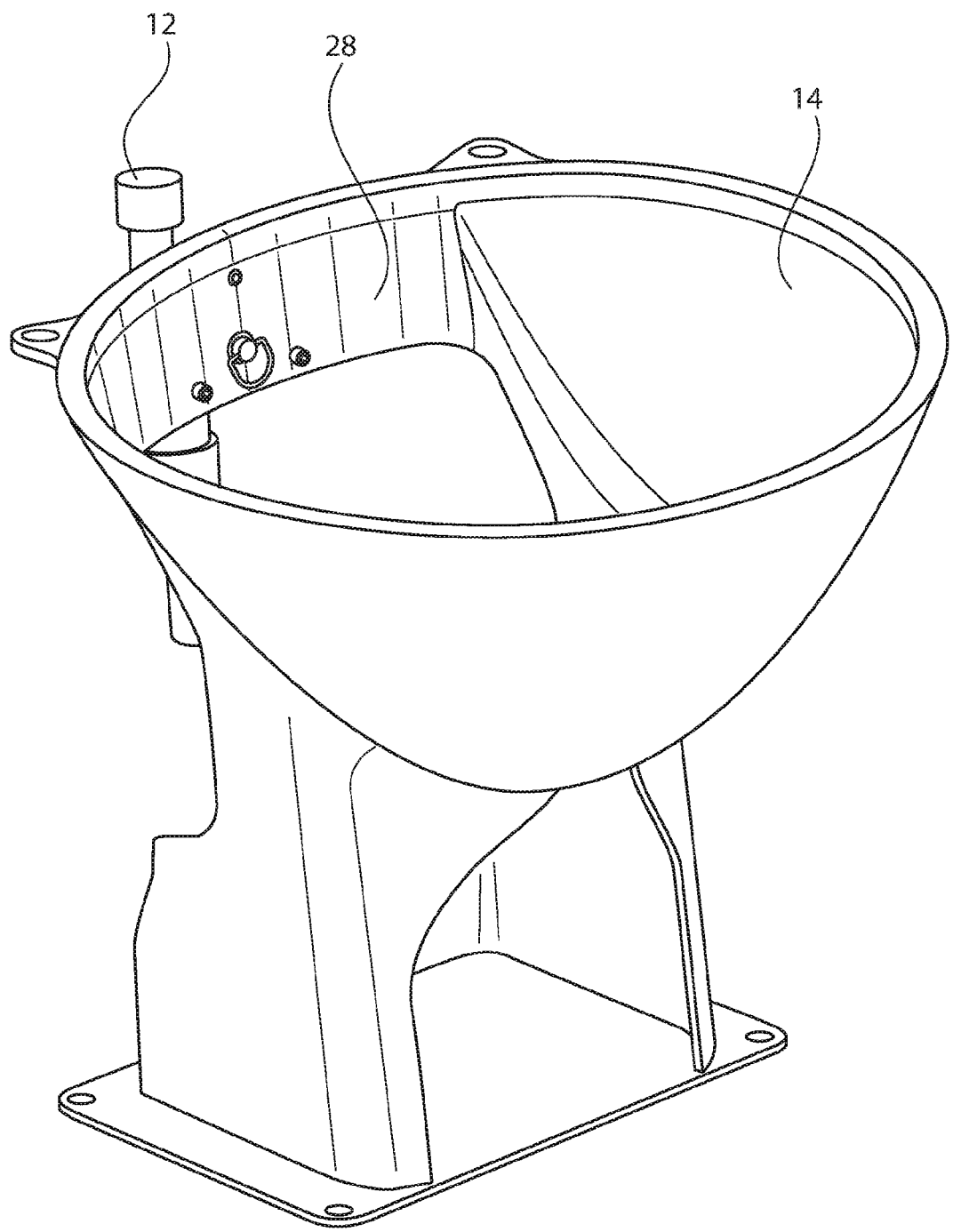
FIG. 1 shows a front perspective view of a toilet pedestal frame.
Figure 2:
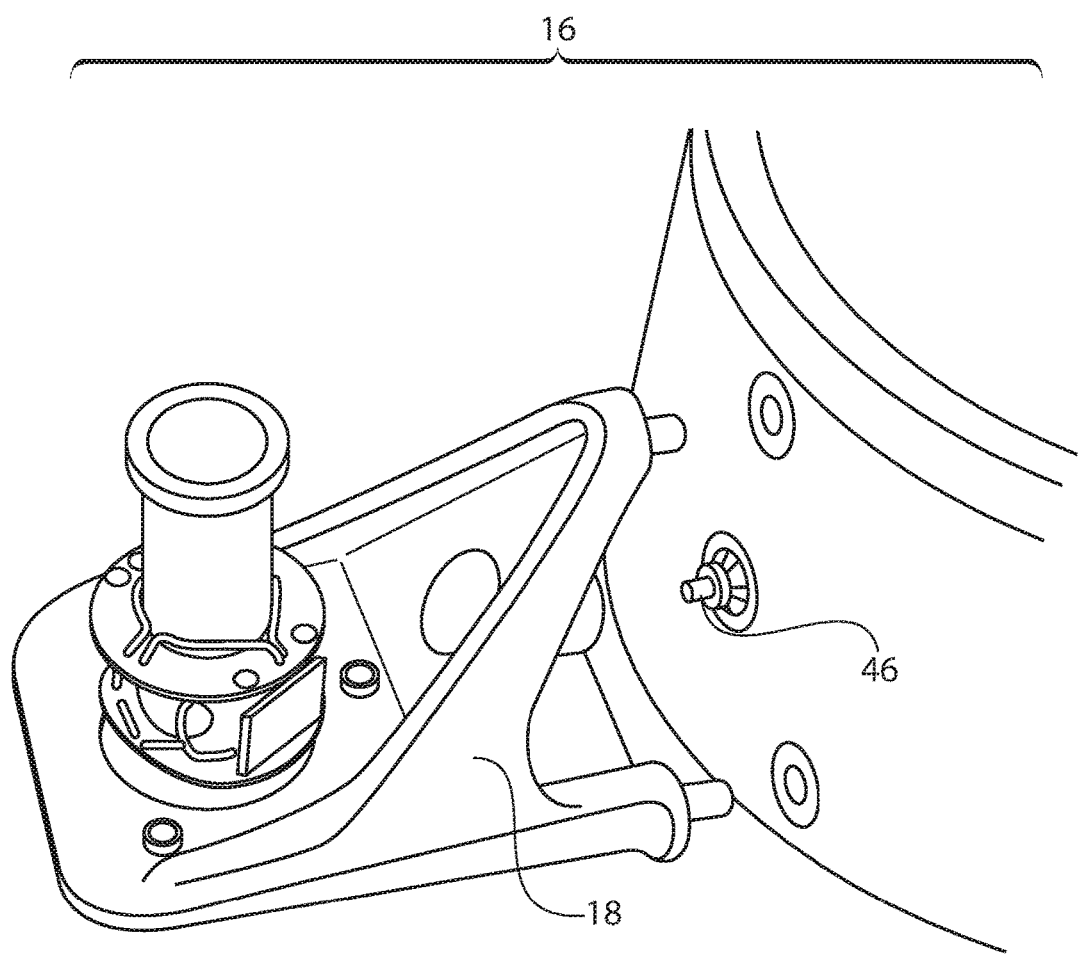
FIG. 2 shows a rear perspective view of the toilet pedestal frame receiving a rinse valve bracket.
Figure 3:
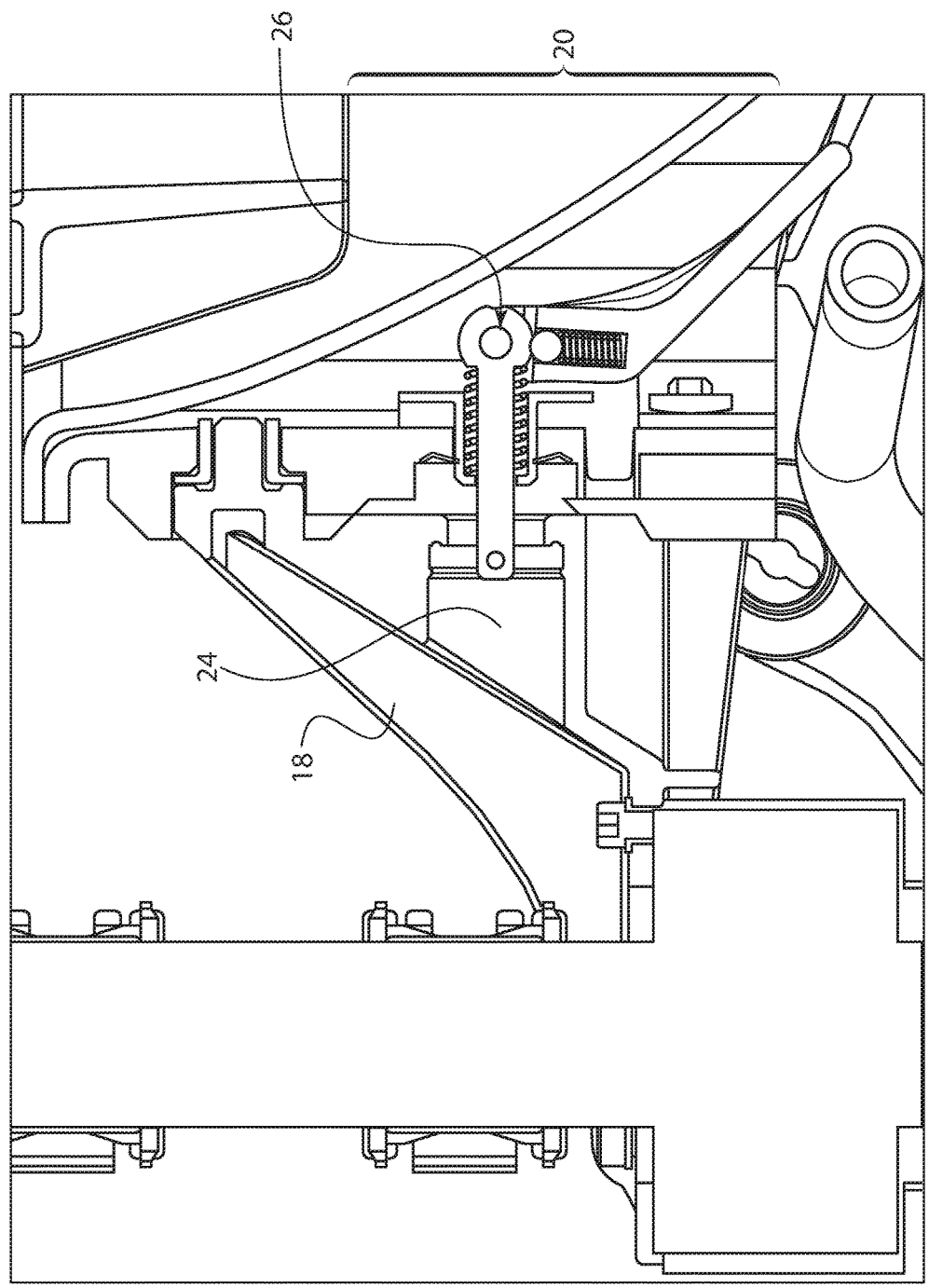
FIG. 3 shows a cross-sectional view of the rinse valve bracket of FIG. 2 position on the frame.
Figure 4:
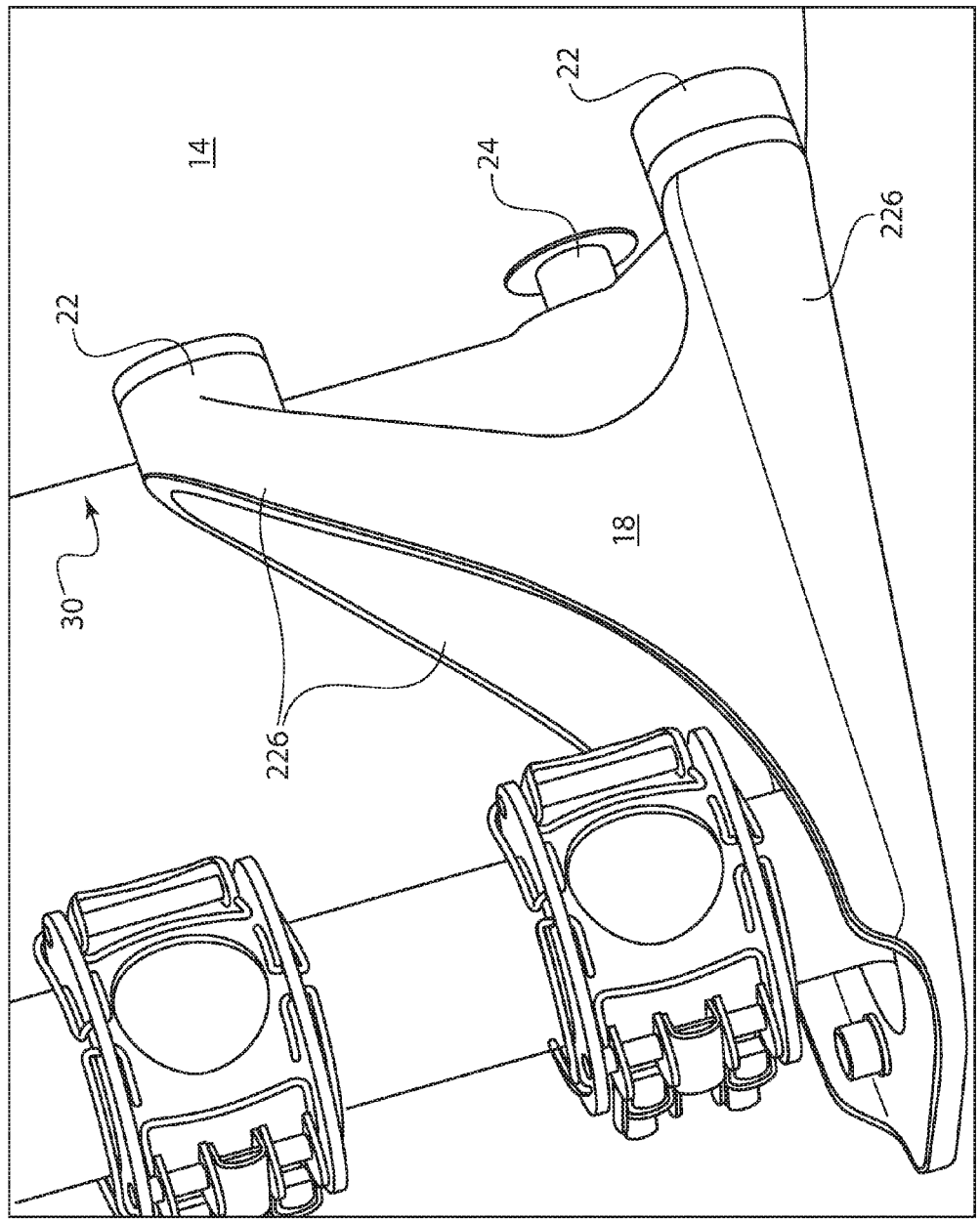
FIG. 4 shows a side perspective view of a rinse valve bracket.
Figure 5:
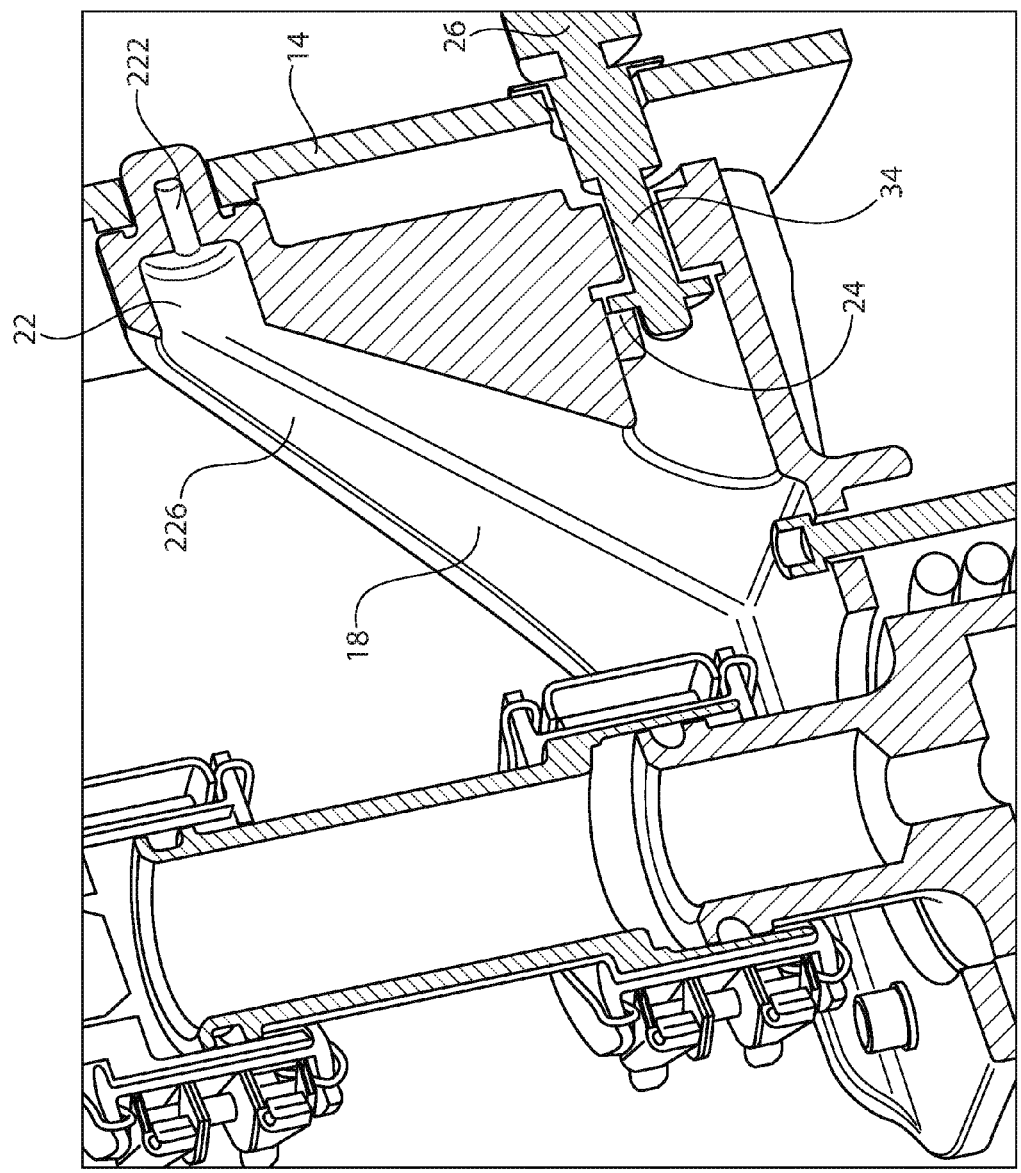
FIG. 5 shows a side cross-sectional view of the rinse valve bracket of FIG. 4.

As illustrated by FIG. 1, one improved feature provided by this disclosure is an improved mounting/securement between the rinse valve 12 and the toilet body pedestal frame 14. As shown by FIGS. 2 and 3, a rinse valve bracket and restraint system 16 includes a rinse valve bracket 18 and a quarter turn cam lock system 20. Referring now to the bracket 18, the bracket 18 may be integrally molded to be a single one-piece bracket. The bracket 18 may have three connection points 22 that cooperate with the toilet frame pedestal 14. FIG. 4 shows that the connection points 22 may be pad and pin connection points to the pedestal. Providing three connection points 22 can help eliminate statically indeterminate rocking of the rinse valve bracket assembly. The three connection points may serve as a balancing support feature for the rinse valve bracket 18. The connection points 22 may abut directly against the pedestal frame 14. In another example, the connection points 22 are pins that extend through corresponding openings 224 in the frame 14. This is shown by FIG. 5.

The legs 226 that support the connection points 22 may all have similar lengths. Alternatively, the legs that support the connection points 22 may have varying lengths from one another. The bracket 18 may have an embedded rigid support that allows for heavy abuse loading. The material of the bracket configuration may be a durable polymer, such as Ultem, PEEK, or polycarbonate. An anti-microbial material may be embedded or impregnated into the bracket 18 and/or applied to the outer surface of the bracket to impart anti-microbial properties thereto. In use, the bracket 18 is positioned at the rear of the toilet frame pedestal 14 and functions to support and connect the rinse valve 12 to the frame 14.

The bracket 18 may have a retainer connection feature 24 designed to cooperate with a quarter turn retainer 26. The retainer connection feature 24 may be centrally located on the bracket 18. In another example, at least one of the connection points 22 may function as a retainer connection feature and be designed to cooperate with a quarter turn retainer 26. The quarter turn retainer 26 is installed along an inner, bowl-facing surface 28 of the pedestal frame 14, such that maintenance personnel can remove and secure the bracket 18 without actually visually accessing the rear face 30 of the pedestal frame 14. As illustrated by FIG. 7, the retainer connection feature 24 may be formed as having an internal opening or female portion 32 in the bracket 18. The retainer connection feature 24 has quarter lock turn functionality. Portion 32 is designed to receive an extending or male portion 34 of the quarter turn retainer 26. (Although one specific embodiment is shown and described, it should be understood that the female and male portions may be reversed between the bracket and the quarter turn retainer.)

Figure 6:
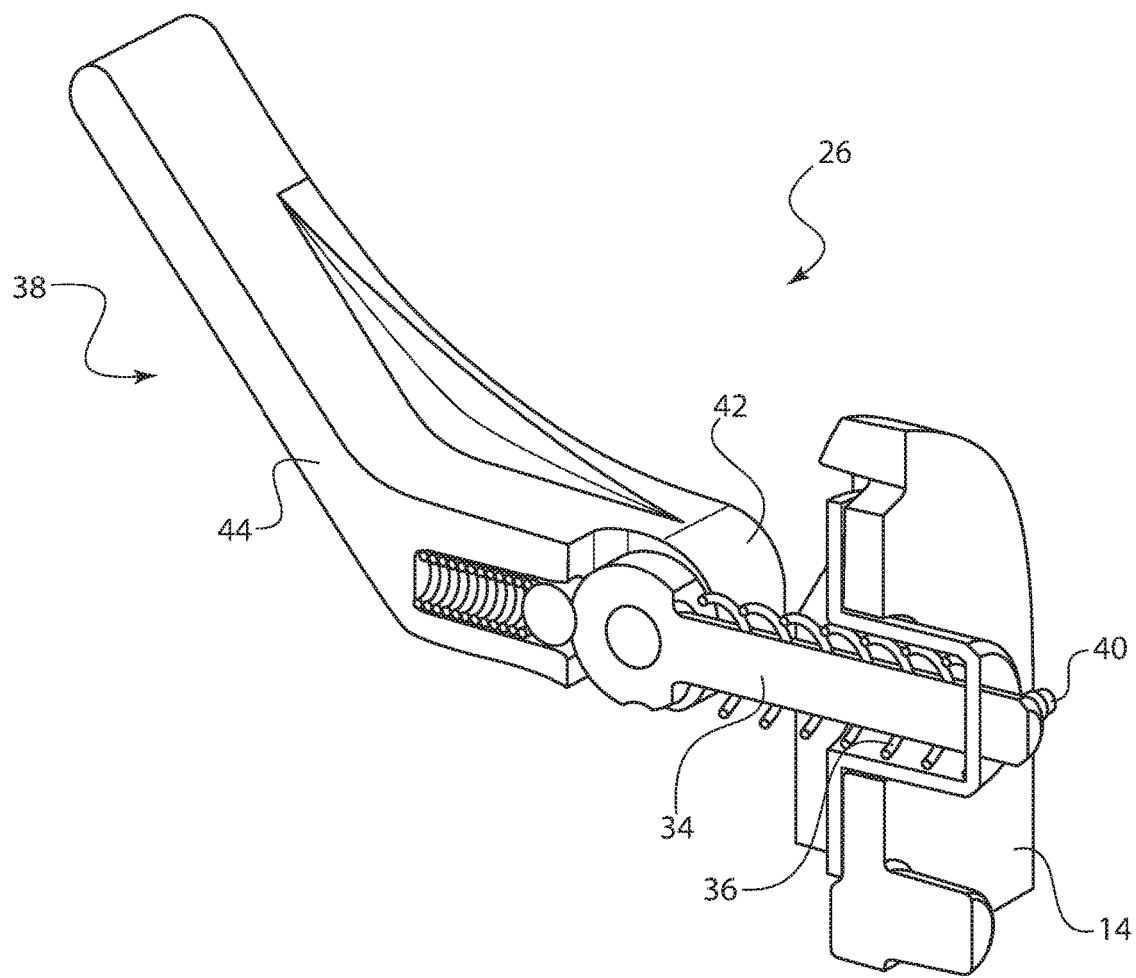
FIG. 6 shows a side perspective view of a quarter turn retainer.

Referring now to the quarter turn cam lock system 20, there is provided a quarter turn retainer 26 as illustrated by FIG. 6. The quarter turn retainer 26 may be secured with respect to the pedestal frame 14 such that it can turn (rotate and laterally slide) with respect thereto but is not removable therefrom. This can be beneficial in narrowing the number of loose parts that may be related to the assembly and disassembly process. It is also possible, however, for the quarter turn retainer 26 to be a fully removable component from the pedestal frame 14.

Figure 7B:
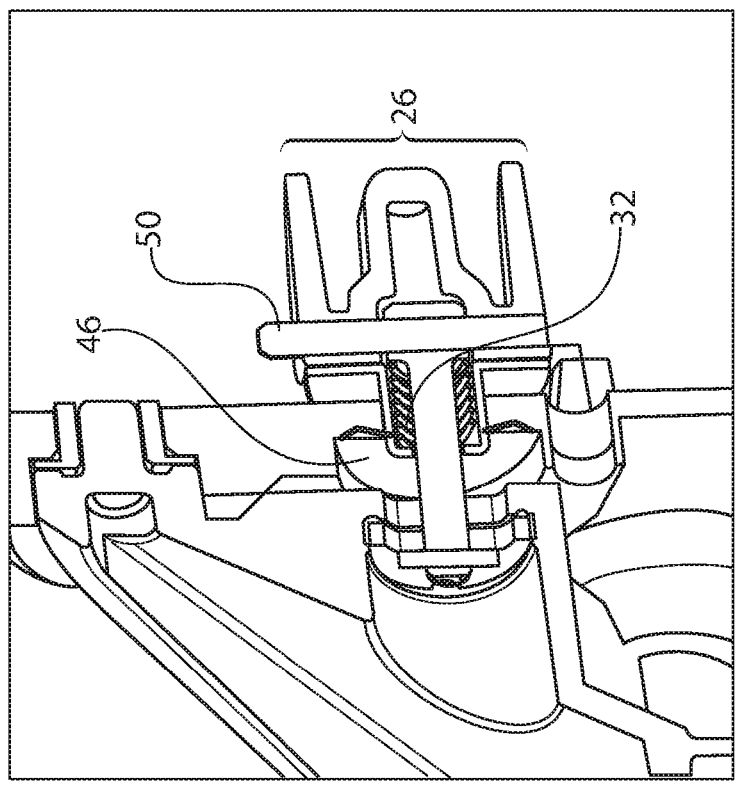
FIG. 7A-7D illustrate a series of figures showing the installation and securement of a quarter turn retainer with respect to a rinse valve bracket onto a toilet pedestal frame.
Figure 7A:
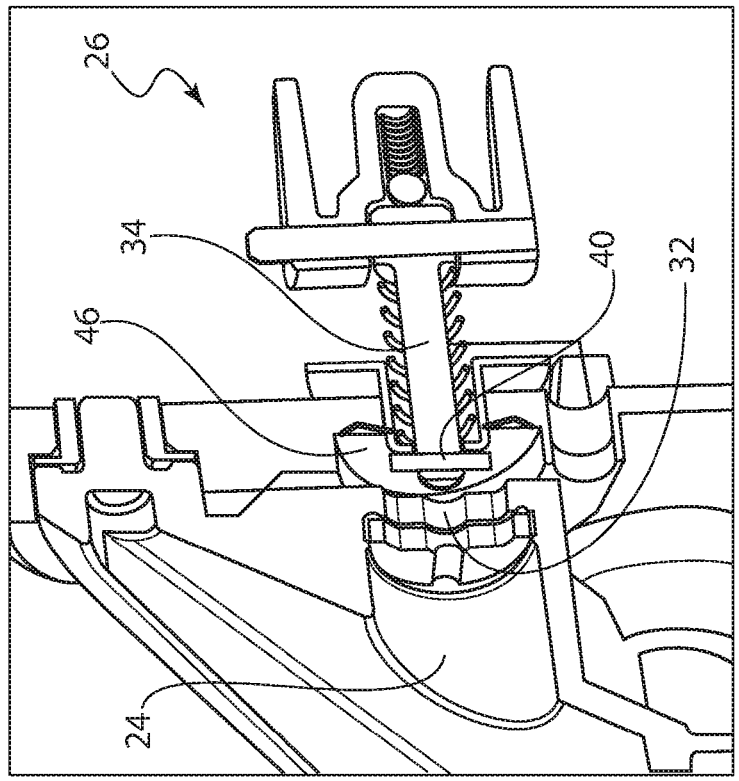
Figure 7D:
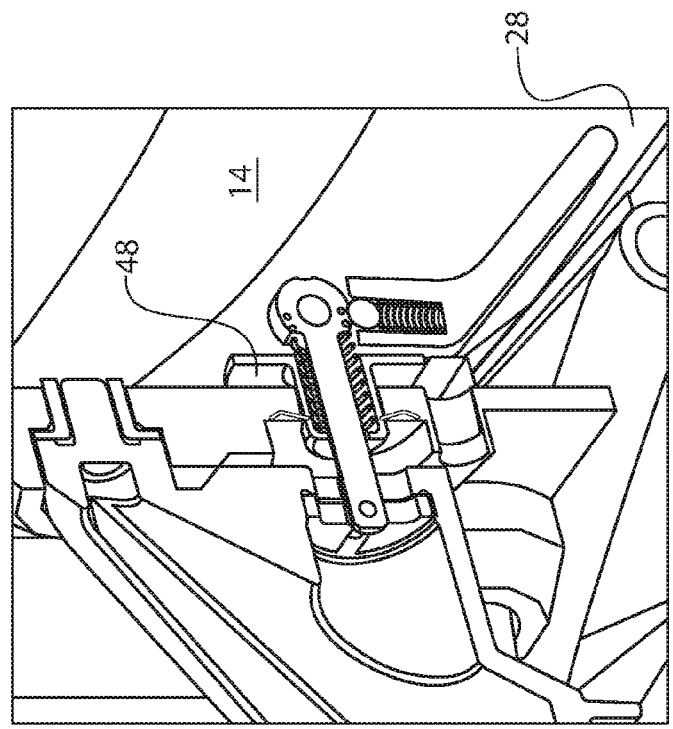
Figure 7C:
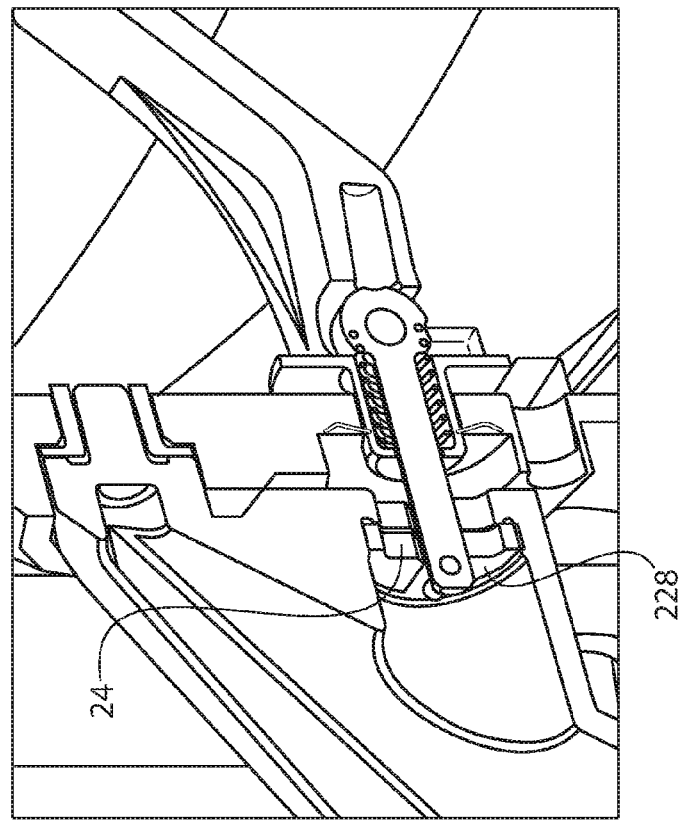
Figure 8:
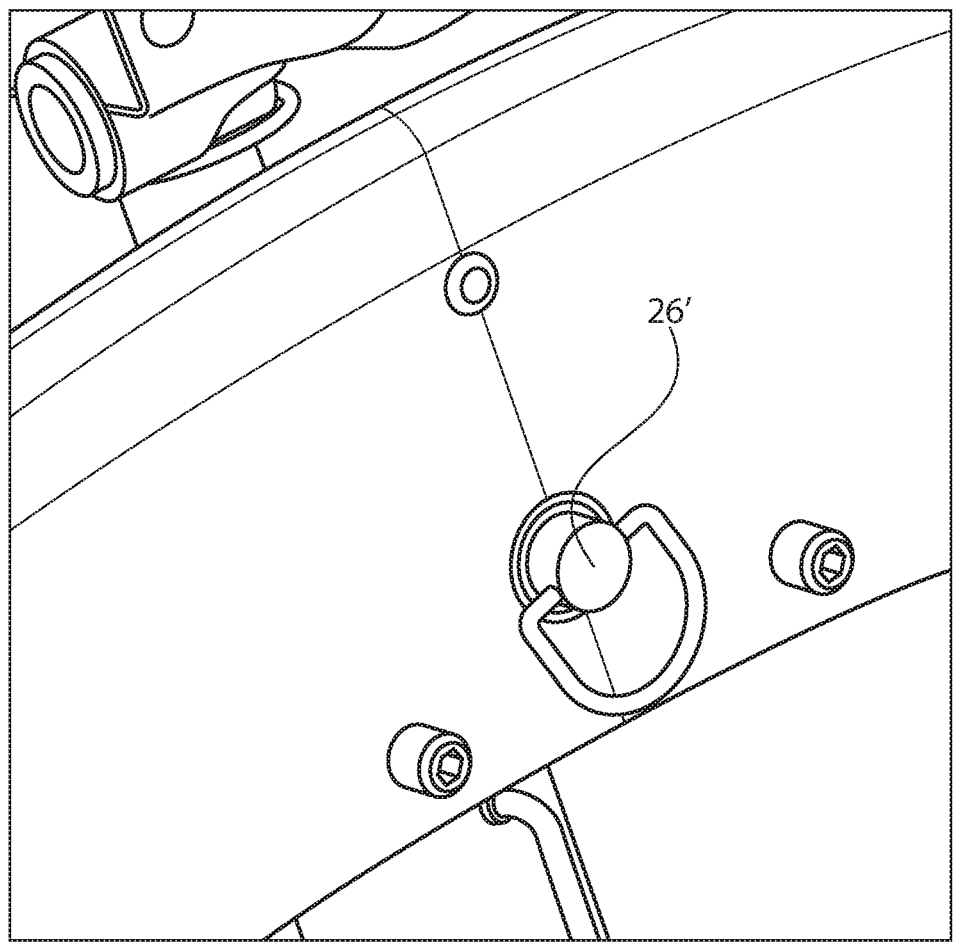
FIG. 8 shows an inner surface of a pedestal frame having an alternate embodiment of a quarter turn retainer in position.
Figure 10:
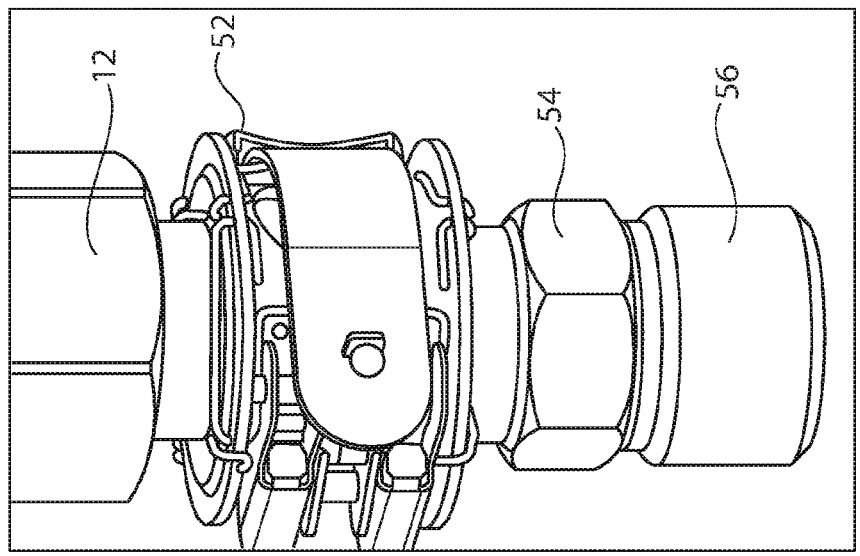
FIG. 10 shows a side perspective view of the rinse valve of FIG. 9.
Figure 9:
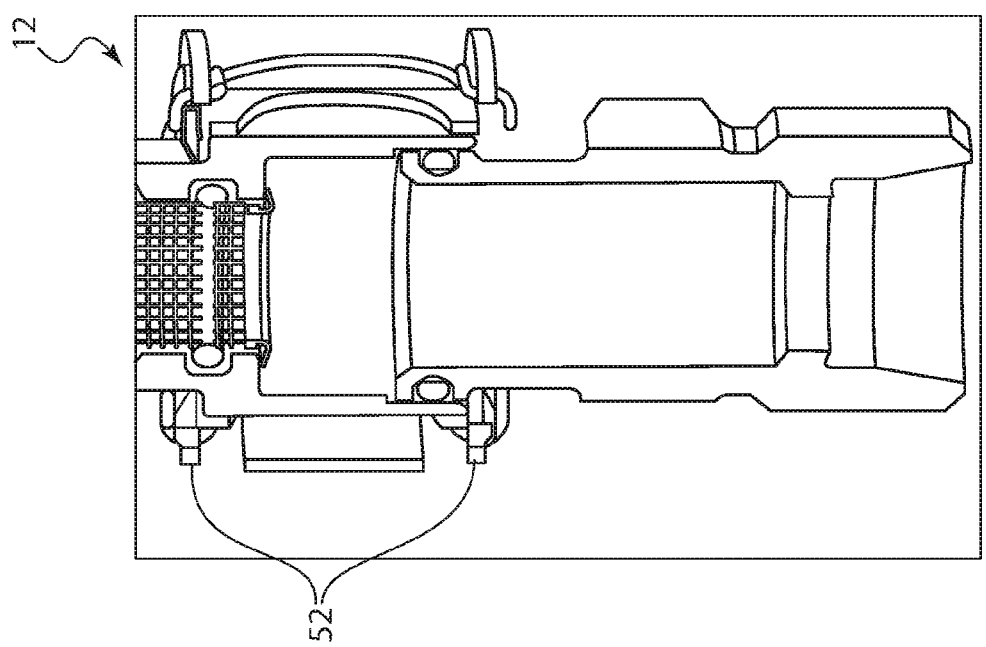
FIG. 9 shows a side cross-sectional view of a rinse valve having a hydraflow clamp.

The quarter turn retainer 26 has an extending male portion 34 which may be surrounded by a spring 36. Cooperating with the male portion 34 is a cam handle 38. The handle portion 38 of the retainer can be accessible from the internal or bowl-facing surface 28 of the frame 14. This is shown by FIGS. 7 and 8. The male portion 34 generally extends through the pedestal frame 14 and out to the other outer side surface of the frame 14. The male portion 34 may have a lock bar 40. Turning of a cam handle 38 causes corresponding turning of the male portion 34 and the lock bar 40. The cam handle 38 may have a cam face 42 and a handle portion 44. The cam face 42 may be shaped to as a round wedge. The cam face 42 may create a slight upward or downward movement of the handle 38 once activated. This can help avoid any resulting axial movement of the bracket 18 that may otherwise occur.

Referring to FIGS. 16A-C, in one example, the cam face 42 has two detents 110, 112. The detents are designed to cooperate with a ball 114 of the handle 38. When the cam handle is in an open, non-locked position, the ball 114 may rest in detent 110. (An example of this open position is illustrated by FIG. 7A. The ball 114 would also be present in the side view of FIG. 7C, but is removed for ease of clarity of the other features.) A spring 108 may be provided in order to urge the ball 114 to a forward position, such that it is forced to engage one of the detents 110, 112 depending upon the position of the handle 28. When the handle is open, the spring 108 urges the ball 114 into detent 110. When the handle 38 is moved to a locked, closed position, as illustrated by FIG. 16C (as well as FIG. 7D), the movement of the handle 38 causes a corresponding movement of the ball 114 into the second detent, detent 112. The spring 108 urges the ball 114 into the detent 112. This can give an audible click and a secure feeling to the user that the handle has been secured and that the quarter turn retainer is securely in place.

Securement between the bracket 18 and the toilet frame pedestal 14 will now be described and illustrated by FIGS. 7A-7D. The toilet frame pedestal 14 is generally provided with a quarter turn securement location 46 at its surface. This is also shown by FIG. 2. This is the location 46 at which the quarter turn retainer 26 may be associated with the frame 14. The retainer connection feature 24 of the bracket is aligned with the location 46. The male portion 34 of the retainer 26 is pushed through the location 46 such that it engages the female portion 32 of the retainer 26. This is illustrated by FIG. 7B. The securement location 46 may function as a key hole, and the male portion 34 may function as a key. Once cooperation has been made, the cam handle 38 is turned. This is illustrated by FIG. 7C. A quarter turn on the cam handle 38 causes a quarter turn of the male portion 30/lock bar 40. This is illustrated by the transition between FIGS. 7B and 7C. Turning of the cam handle 38 thus causes corresponding turning of the male portion 34 and lock bar 40. The lock bar 40 functions as a cross pin that can become seated in a groove 228 of the retainer connection feature 24. There may be provided one or more extending stops 50 extending from either side of the cam handle 38. Extending stops 50 may function to abut a corresponding lip on the toilet frame 14 to prevent over rotation and to ensure that a proper securement connection has been made.

The cam handle 38 may then be clamped closed, in order to cause a secure attachment of the bracket 18 to the frame 14. This is illustrated by FIG. 7D. As described above, the ball 114 moves into the detent 112 of the cam face 42 once the handle is fully clamped and secured. This ball detent feature may be provided to help keep the cam handle 38 from disengaging from the inner surface 28 of the frame 14. The cam profile of the handle 38 pulls the assembly tight. A rubber washer 48 or o-ring may be positioned at the interface between the frame pedestal 14 and the connection point 22 of the bracket 18. Squeezing of the rubber washer or o-ring 48 can help allow for tolerance stack up differences. The spring-load of the quarter turn retainer 26 may help facilitate easy assembly and disassembly. The cross-sectional view of FIG. 3 shows an installed bracket 18 using the rinse valve bracket and restraint system 16 described. Being able to activate the quarter turn retainer 26 from the inside face 28 of the bowl frame pedestal allows maintenance personnel to attach and reattach the rinse valve bracket 18 without careening his or her neck to visually access the rear of the toilet frame bowl area. FIG. 8 illustrates an alternate quarter turn retainer 26'. (One example of such a retainer 26' is described and shown below with respect to the rinse ring in FIG. 14.)

When the handle 38 is in a clamped position, the shape of the handle 38 can align or follow the outer profile shape 104 of the bowl 100. Specifically, the handle 38 may have a curved elbow 116 that causes the shape of the handle to curve similarly to the curve of the toilet bowl. In use, once the bracket 18 is positioned and supporting the rinse valve using the rinse valve bracket and restraint system described, the removable toilet bowl 100 may be positioned with respect to the pedestal frame 14, such that the bowl sits in the frame opening. Removal of the rinse valve is understandably most undesirable in this position. Accordingly, the shape of the handle 38, including the curved elbow 116, can provide a secondary containment system that help keep the bowl 100 in place.

A further improvement provided herein relates to the rinse valve 12 securement. Rather than having a traditional threaded connection at its base, the rinse valve 12 may be provided with a quick release connection 52. The quick release connection may include but is not limited to a hydra flow clamp connection, an Adel Wiggins tube connector, or any other equivalent or appropriate fastener that allows for quick and easy release and removal. This allows removal of the rinse valve 12 from the bracket 18 and related features without any tools. For example, the quick release connection may be a spring loaded clamp used with a sleeve that allows easy attachment of the rinse valve to the bracket. The clamp 52 may be opened and closed to connect and disconnect the rinse valve 12 from the remaining toilet components. This can allow modularity for the toilet components.

An adapter 54 may be used on the other side of the clamp 52 to convert the hydra flow clamp 52 connection to a standard aircraft threaded connection. For example, the adapter 52 may be a hex that allows an installer to use a backup wrench to keep the inlet of the rinse valve from spinning during installation of the water line and to prevent unwanted torque applied to the rinse valve 12. A threaded water connection 56 that interfaces with existing aircraft water connections may then be provided.

Figure 11:
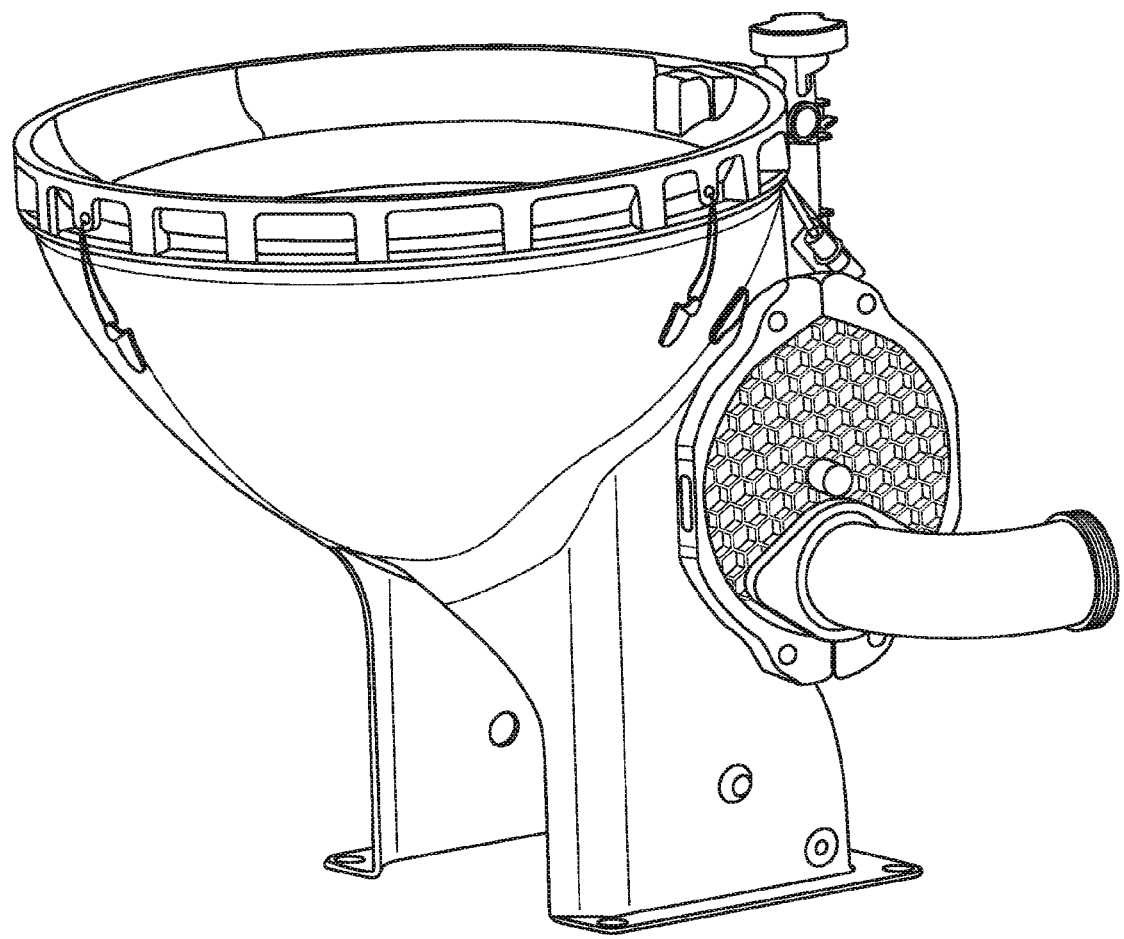
FIG. 11 shows a side perspective view of a prior art securement of a rinse ring to a toilet frame.
Figure 12:
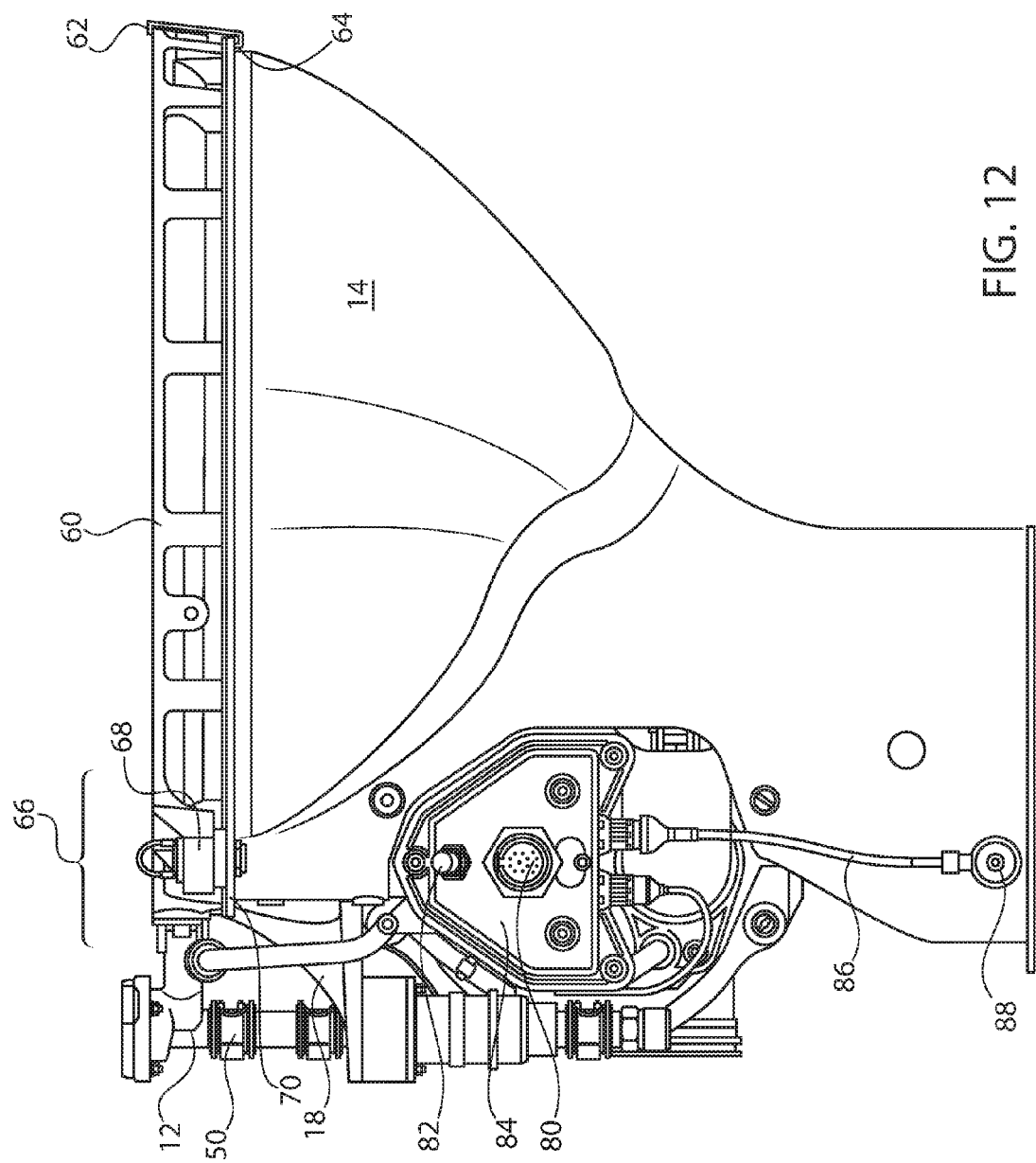
FIG. 12 shows a side plan view of an improved securement of a rinse ring to a toilet frame.

A further improved feature is an improved mounting/securement between the rinse ring 60 and the toilet body pedestal frame 14. Traditional rinse rings were secured to the pedestal frame via elastomers, which functioned much like rubber bands. The elastomers extended from the ring and were secured to one or more protrusions on the pedestal body. One example of this prior art attachment is illustrated by FIG. 11. The present disclosure provides a rinse ring 60 with improved securement features. As shown by FIG. 12, the rinse ring 60 may be provided with a front hook 62 that secures the rinse ring 60 to the frame 14. The frame 14 may have a front lip 64 that can receive or otherwise secure the hook 62 in place. The lip 64 may be a ledge, a corresponding opening, a front grate, or any other option positioned on the toilet frame 14 that can secure the rinse ring hook 62. The hook 62 may be provided along a front portion of the rinse ring. In another example, one or more hooks 62 may be provided along sides of the rinse ring.

Figure 13:
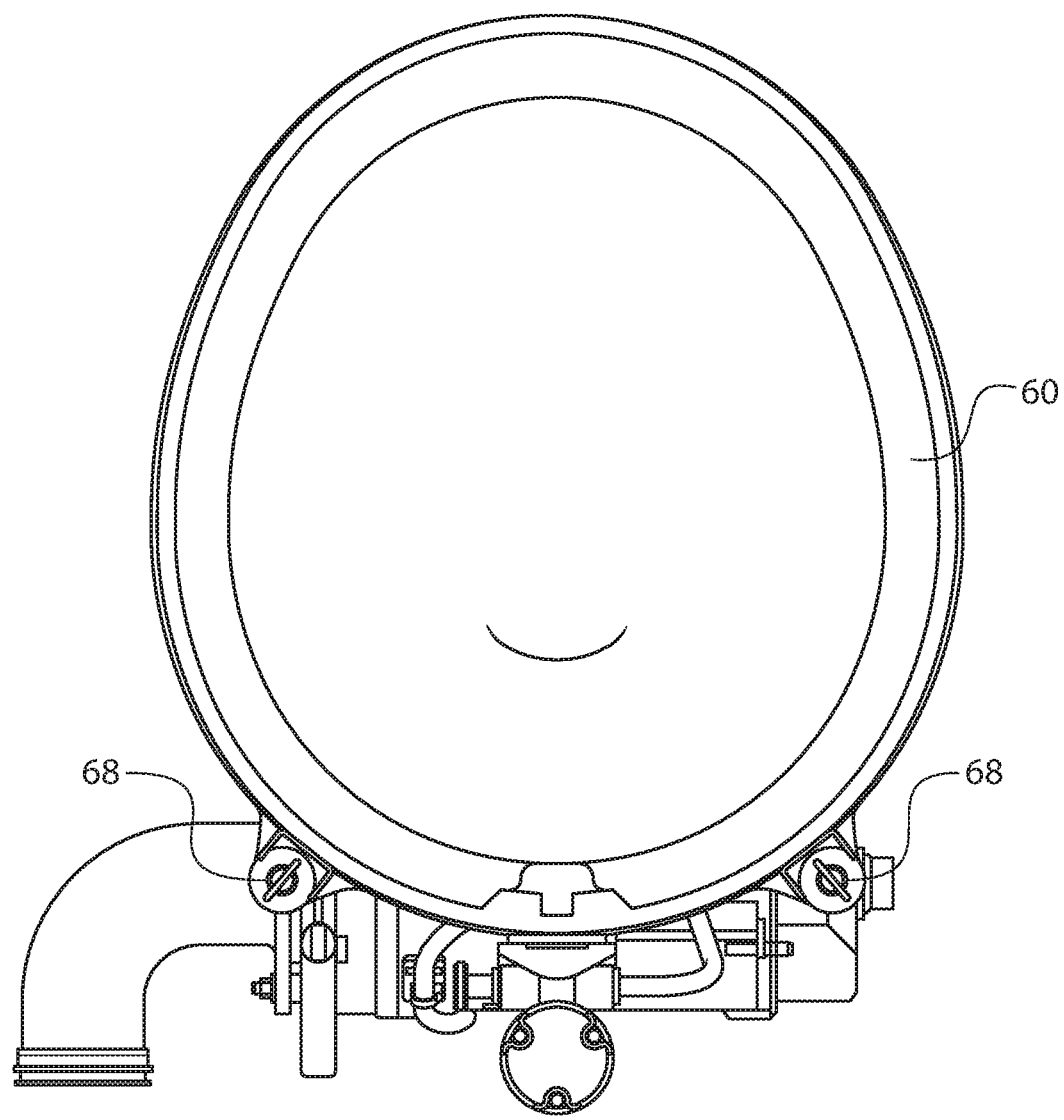
FIG. 13 shows a top plan view of the rinse ring securement of FIG. 12.
Figure 14:
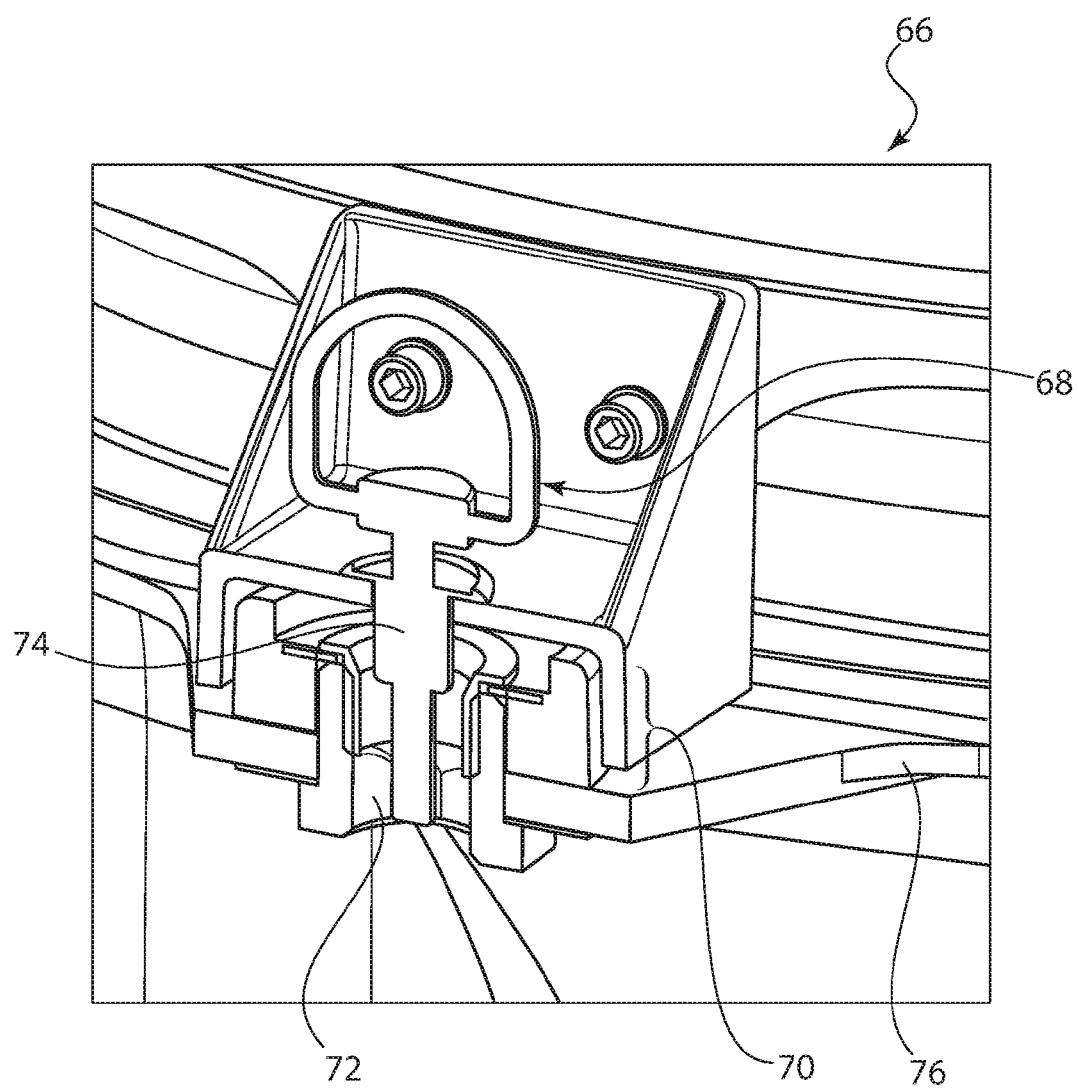
FIG. 14 shows a side cross-sectional view of a quarter turn feature of the rinse ring of FIGS. 12 and 13.

The rinse ring 60 may also be provided with a quarter turn system 66. The quarter turn system 66 illustrated by FIGS. 12 and 13 generally shows two quarter turn features 68 positioned near the rear portion of the rinse ring 60. (Although two quarter turn features 68 are shown, it should be understood that only a single feature 68 or more than two features 68 may be provided.) The pedestal frame 14 is provided with a corresponding quarter turn cooperating/receiving feature 70. This is shown by FIG. 14. The cooperating/receiving feature 70 may generally be provided as a female portion 72 that receives a protruding stud 74 of a quarter turn feature 68. The receiving/cooperating feature 70 may be provided on extending platforms 76. In another example, the receiving/cooperating feature 70 may be provided on a full external lip extending around the rear portion of the pedestal frame only, or extending around the full pedestal frame.

In use, the hook 62 (or hooks 62) of the rinse ring 60 is engaged to cooperate with the lip 64 of the toilet pedestal frame 14. Each quarter turn feature 68 is aligned with a corresponding quarter turn cooperating/receiving feature 70. The quarter turn feature 68 is engaged a quarter turn such that the rinse ring 60 is securely attached to the pedestal frame 14, as shown by FIGS. 12 and 13.

A further design improvement to the toilet systems described herein is an improved aircraft connector 80 and maintenance switch button 82. First, previous systems have used a harness for internal connections. The harness has been removed and replaced by a more compact connector design. As illustrated by FIG. 12, the aircraft connector 80 may be positioned on the flush valve housing 84. This design can remove the number of exposed wires, replacing them with internal, non-exposed wires. Next, the maintenance switch 82 is positioned near the aircraft connector 80 for easier access.

A further design improvement is an improved grounding and bonding system. There is a requirement that toilet wires and electrical components be sealed from the environment so that their resistance does not change over time. The present disclosure provides a sealed upper connector integrated into the flush control unit (FCU) housing 84. The grounding cable 86 extends straight from the FCU down to the grounding stud 88. This shortens the length of the grounding cable over previous toilet designs.

Figure 15:
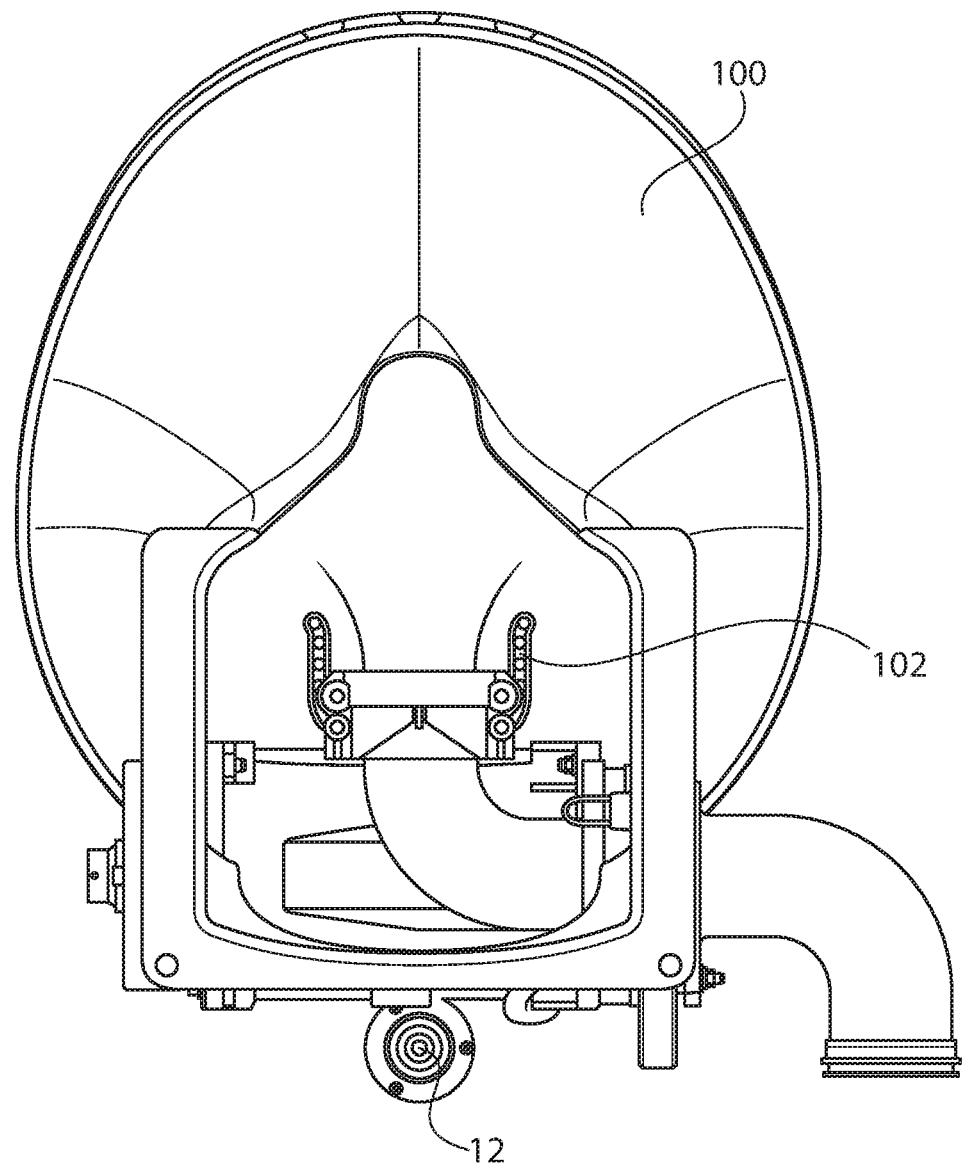
FIG. 15 shows a cross-sectional view of an improved toilet bowl securement.
Figure 17:
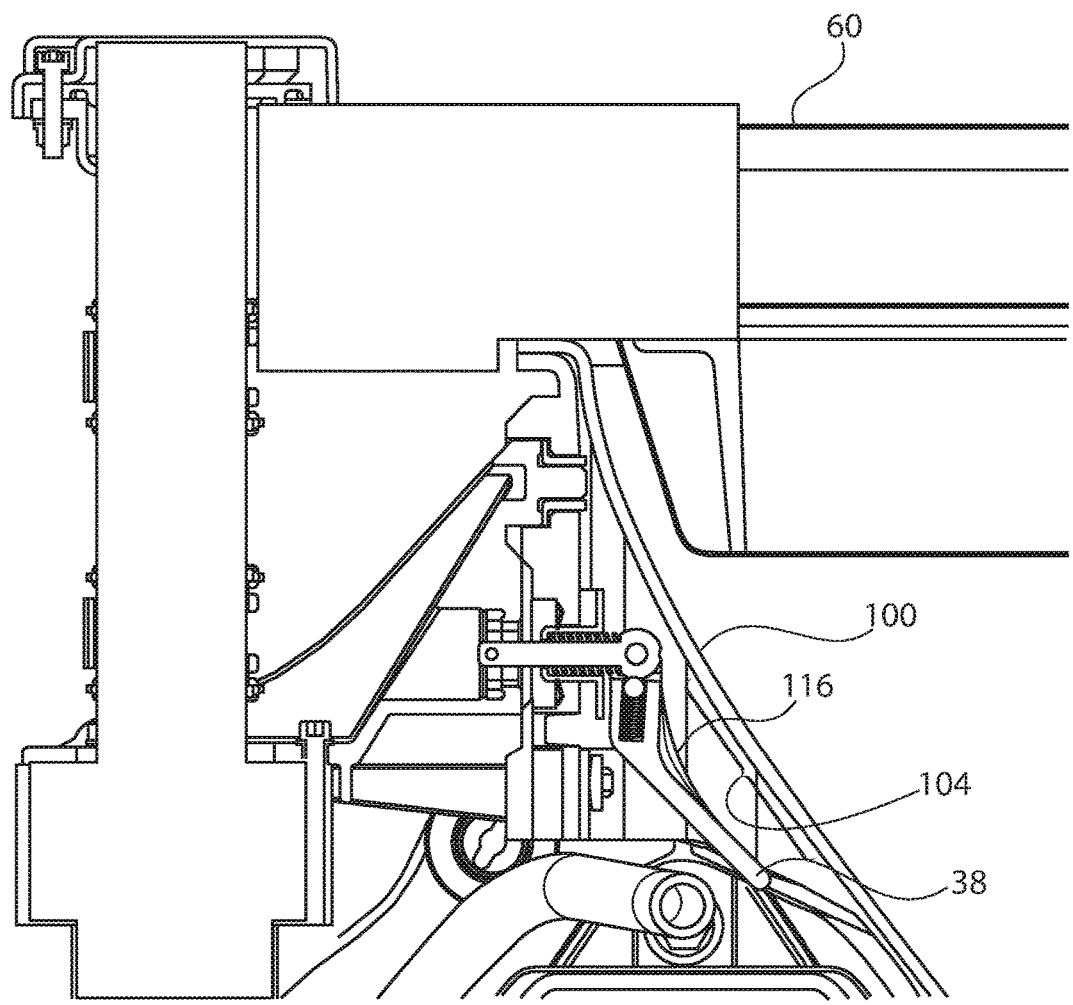
FIG. 17 shows a side cross-sectional view of the toilet pedestal frame with a bowl positioned therein, and a quarter turn retainer securing the rinse valve bracket in place.

FIG. 15 illustrates a bottom plan view showing a removable toilet bowl 100. The toilet bowl may be positioned within an opening of the toilet pedestal frame and secured to the frame with levers 102.

Changes and modifications, additions and deletions may be made to the structures and methods recited above and shown in the drawings without departing from the scope or spirit of the disclosure or the following claims.

What is claimed is:

1. A rinse valve bracket and restraint system for a toilet pedestal frame having an outer surface and a bowl-facing surface, the system comprising:
    a bracket comprising a retainer connection feature; the toilet pedestal frame comprising a quarter turn securing location supporting a quarter turn retainer extending through the frame and comprising a cam handle, a cam face, and an extending male portion,
    wherein in use, the bracket is positioned along the outer surface of the toilet frame with the retainer connection feature aligned with the quarter turn securing location,
    wherein the quarter turn retainer is inserted into the retainer connection feature of the bracket, turned, and clamped, securing the bracket to the toilet pedestal frame.

2. The system of claim 1, wherein the bracket comprises three connection points.

3. The system of claim 1, wherein the quarter turn retainer is rotatably and slidably connected with respect to the toilet pedestal frame but is not removable therefrom.

4. The system of claim 1, wherein the quarter turn retainer further comprises a spring.

5. The system of claim 1, wherein the cam face of the quarter turn retainer comprises first and second detents, wherein a ball of the handle is urged into the first detent when the handle is in an unlocked position, and wherein the ball of the handle is urged into the second detent when the handle is in a locked position.

6. The system of claim 1, wherein the quarter turn securing location provides a keyhole feature and wherein the male portion of the quarter turn retainer functions like a key.

7. The system of claim 1, wherein the quarter turn securing location further comprises a rubber washer.

8. The system of claim 1, wherein the rinse valve bracket secures a rinse valve with respect to the toilet frame, wherein the rinse valve further comprises a hydraflow clamp.

9. The system of claim 1, wherein the quarter turn retainer is accessible from the bowl-facing surface of the toilet pedestal frame.

10. The system of claim 1, wherein the can handle is shaped with a curved elbow such that is follows a toilet bowl contour when in a locked position.

11. A rinse ring securement system for a toilet pedestal frame, the system comprising:
    a rinse ring comprising at least one quarter turn feature;
    the toilet pedestal frame comprising at least one corresponding quarter turn connection/receiving feature.

12. The system of claim 11, wherein the toilet pedestal frame comprises an extending platform to support the corresponding quarter turn connection/receiving feature.

13. The system of claim 11, further comprising first and second quarter turn features on the rinse ring and first and second corresponding quarter turn connection/receiving features on the toilet pedestal frame.

14. The system of claim 11, wherein the at least one quarter turn feature is accessible from the top of the toilet pedestal frame when the rinse ring is secured thereto.

* * * * *